(12) United States Patent
Ito et al.

(10) Patent No.: US 11,308,091 B2
(45) Date of Patent: Apr. 19, 2022

(54) INFORMATION COLLECTION SYSTEM, INFORMATION COLLECTION METHOD, AND RECORDING MEDIUM

(71) Applicant: NEC CORPORATION, Tokyo (JP)

(72) Inventors: Tatsuya Ito, Tokyo (JP); Yuki Ashino, Tokyo (JP); Masato Yamane, Tokyo (JP)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 16/334,074

(22) PCT Filed: Sep. 20, 2017

(86) PCT No.: PCT/JP2017/033876
§ 371 (c)(1),
(2) Date: Mar. 18, 2019

(87) PCT Pub. No.: WO2018/056299
PCT Pub. Date: Mar. 29, 2018

(65) Prior Publication Data
US 2019/0213190 A1    Jul. 11, 2019

(30) Foreign Application Priority Data

Sep. 26, 2016   (JP) .............................. JP2016-187064

(51) Int. Cl.
*G06F 16/25* (2019.01)
*G06F 16/2455* (2019.01)
(Continued)

(52) U.S. Cl.
CPC ........ *G06F 16/24558* (2019.01); *G06F 16/00* (2019.01); *G06F 16/254* (2019.01);
(Continued)

(58) Field of Classification Search
CPC .................................................... G06F 16/254
See application file for complete search history.

(56) References Cited

U.S. PATENT DOCUMENTS

| 2014/0136494 | A1 | 5/2014 | Surya |
| 2014/0372478 | A1* | 12/2014 | Zhao ................... G06F 16/9535 707/770 |
| 2016/0224659 | A1* | 8/2016 | Robichaud ............ G06F 16/313 |

FOREIGN PATENT DOCUMENTS

| JP | 10-198706 A | 7/1998 |
| JP | 2009-098964 A | 5/2009 |

(Continued)

OTHER PUBLICATIONS

International Search Report of PCT/JP2017/033876 dated Oct. 31, 2017 [PCT/ISA/210].

(Continued)

*Primary Examiner* — Hau H Hoang
(74) *Attorney, Agent, or Firm* — Sughrue Mion, PLLC

(57) ABSTRACT

An information collection system for efficiently collecting target information from an enormous amount of contents in a variety of formats is provided. The information collection system 100 includes a learning unit 110 and an extraction unit 130. The learning unit 110 generates, by using learning data, a parser rule for extracting a target character string from data, the target character string being a character string including specific information. The extraction unit 130 extracts the target character string from data by using the parser rule.

6 Claims, 20 Drawing Sheets

(51) Int. Cl.
  *G06N 5/02* (2006.01)
  *G06F 16/00* (2019.01)
  *G06F 16/951* (2019.01)
  *G06F 16/31* (2019.01)
  *G06N 20/00* (2019.01)

(52) U.S. Cl.
  CPC .......... *G06F 16/313* (2019.01); *G06F 16/951* (2019.01); *G06N 5/02* (2013.01); *G06N 20/00* (2019.01)

(56) References Cited

FOREIGN PATENT DOCUMENTS

| | | |
|---|---|---|
| JP | 2010-204866 A | 9/2010 |
| JP | 2011-100403 A | 5/2011 |
| JP | 2012-529717 A | 11/2012 |
| JP | 2014-049094 A | 3/2014 |
| JP | 2014-182445 A | 9/2014 |
| JP | 2015-090664 A | 5/2015 |
| JP | 2015-222515 A | 12/2015 |

OTHER PUBLICATIONS

Written Opinion of PCT/JP2017/033876 dated Oct. 31, 2017 [PCT/ISA/237].

* cited by examiner

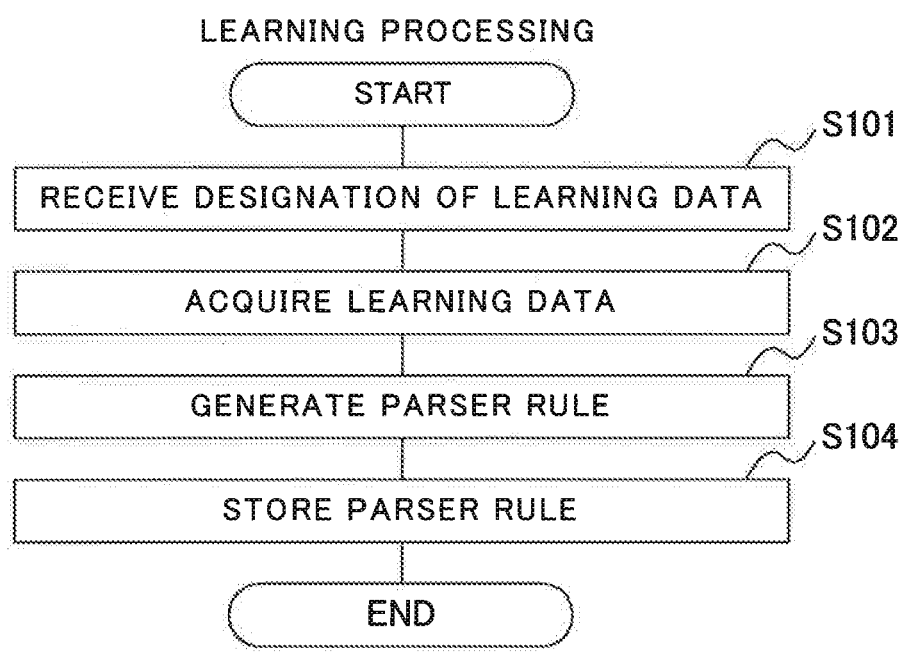

Fig.5

DESIGNATION OF LEARNING DATA

TABLE NAME: SNS1

DATA LABEL: Post

| URL1 (http://hoge.com/m1/...), Keyword1 |
| URL2 (http://hoge.com/m2/...), Keyword2 |
| URL3 (http://hoge.com/m3/...), Keyword3 |

LEARNING DATA

`<a><b class="post" id=1><c name="user1"> Keyword1 </c></b></a>`

`<a><b class="post" id=2><c name="user2"> Keyword2 </c></b></a>`

`<a><b class="post" id=3><c name="user3"> Keyword3 </c></b></a>`

PARSER RULE

`<a><b class="post"><c> Value </c></b></a>`

PARSER RULE

`<a><b class="post"><c> Value </c></b></a>`

| TABLE NAME | DATA LABEL | URL |
|---|---|---|
| SNS1 | Post | http://hoge.com |

Fig.6

| TABLE NAME | DATA LABEL | URL | PARSER RULE |
|---|---|---|---|
| SNS1 | Post | http://hoge.com | \<a\>\<b class="post"\>\<c\> Value \</c\>\</b\>\</a\> |
| SNS1 | Date | http://hoge.com | : |
| SNS1 | User | http://hoge.com | : |
| SNS2 | Post | http://foo.com | \<d\>\<e class="post"\>\<f\> Value \</f\>\</e\>\</d\> |
| SNS2 | Date | http://foo.com | : |
| SNS2 | User | http://foo.com | : |
| SNS3 | Post | http://bar.com | \<g\>\<h class="post"\>\<k\> Value \</k\>\</h\>\</g\> |
| SNS3 | Date | http://bar.com | : |
| SNS3 | User | http://bar.com | : |

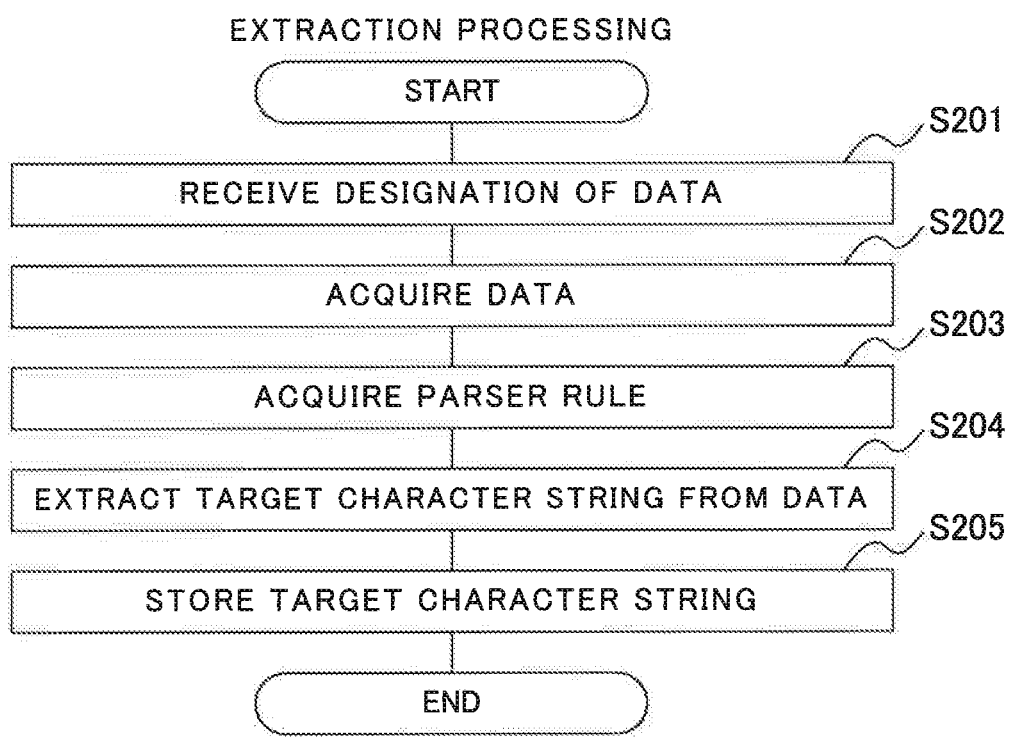

Fig.9

TABLE:SNS3

TABLE:SNS2

TABLE:SNS1

| Date | User | Post |
|---|---|---|
| 2015/12/15 12:24 | user01 | GOOD MORNING |
| 2015/12/15 12:25 | user10 | IT IS SHAKING |
| 2015/12/15 12:25 | user12 | I WOKE UP |
| 2015/12/15 12:25 | user23 | EARTHQUAKE OCCURRING NOW |
| 2015/12/15 12:26 | user03 | GOOD NIGHT |

Fig.14

ALARM MAIL

TRANSMISSION DATE AND TIME: 2015/12/15 12:30
From: system
TO: user10@hoge.com
TITLE. DISASTER OCCURRENCE
MAIN TEXT·
PREFECTURE A  SEISMIC INTENSITY 1  TOWN C
PREFECTURE B  SEISMIC INTENSITY 1  TOWN D

THERE IS NO FEAR OF TSUNAMI WITH THIS EARTHQUAKE.

DETAILED INFORMATION: (SEE EARTHQUAKE INFORMATION OF METEOROLOGICAL AGENCY)

Fig. 18

TABLE: SNS1

| Date | User | Post |
|---|---|---|
| 2015/12/15 12:24 | user01 | GOOD MORNING |
| 2015/12/15 12:25 | user10 | IT IS SHAKING |
| 2015/12/15 12:25 | user12 | I WOKE UP |
| 2015/12/15 12:25 | user23 | EARTHQUAKE OCCURRING NOW http://news.com/news1.html |
| 2015/12/15 12:26 | user03 | GOOD NIGHT |
| 2015/12/15 12:27 | user35 | EARTHQUAKE OCCURRING http://news.com/news2.html |
| : | : | : |

Fig. 19

TABLE:SNS1

| Date | User | Post |
|---|---|---|
| 2015/12/15 12:24 | user01 | GOOD MORNING |
| 2015/12/15 12:25 | user10 | IT IS SHAKING |
| 2015/12/15 12:25 | user12 | I WOKE UP |
| 2015/12/15 12:25 | user23 | EARTHQUAKE OCCURRING NOW http://news.com/news1.html |
| 2015/12/15 12:26 | user03 | GOOD NIGHT |
| 2015/12/15 12:27 | user35 | EARTHQUAKE OCCURRING http://news.com/news2.html |
| ... | ... | ... |

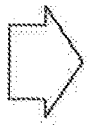

EARTHQUAKE OCCURRING NOW http://news.com/news1.html

EARTHQUAKE OCCURRING http://news.com/news2.html

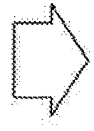

URL1: http://news.com/news1.html, KEYWORD "EARTHQUAKE"
URL2: http://news.com/news2.html, KEYWORD "EARTHQUAKE"

INPUT AS LEARNING DATA TO LEARNING UNIT 110

INFORMATION COLLECTION SYSTEM, INFORMATION COLLECTION METHOD, AND RECORDING MEDIUM

CROSS REFERENCE TO RELATED APPLICATIONS

This application is a National Stage of International Application No. PCT/JP2017/033876, filed Sep. 20, 2017, claiming priority to Japanese Patent Application No. 2016-187064, filed Sep. 26, 2016, the contents of all of which are incorporated herein by reference in their entirety.

TECHNICAL FIELD

The present invention relates to an information collection system, an information collection method, and a recording medium.

BACKGROUND ART

From Web contents provided in a variety of services on the Internet, which include social networking services (SNSs), blogs, homepages, and the like, pieces of necessary information are collected, and analysis and control for the collected information are performed in a variety of ways. Since the Web contents are enormous, information collection by crawling and the like based on a program, and automation of analysis and control for the collected information are required.

The Web contents are generally described by the Hyper-Text Markup Language (HTML), and positions where necessary information to be collected is described on the contents (portions of users' messages in the SNSs, for example) are different from each other depending on the services. Moreover, in many cases, these positions are not laid open as clear specifications by service providers. Therefore, in order to collect information from the Web contents, it is necessary for a developer to develop a parser program for analyzing contents for each service and extracting necessary information. Furthermore, in this case, it is necessary to change the parser program every time a specification of the contents is changed, and programing cost is also increased. As described above, in the information collection from the Web contents, there is a problem that target information cannot be efficiently collected from such an enormous amount of contents in a variety of formats.

As a related technology related to information collection from Web contents, for example, PTL 1 discloses a technology that classifies micro blog messages in accordance with a classification rule. PTL 2 discloses a technology which learns an interest and a preference of a user from a document created by the user, and uses the learned interest and preference for recommending other users and blogs and transmitting advertisements. PTL 3 discloses a technology which extracts an article according to an extraction condition from articles of news or the like, and updates the extraction condition according to an amount of comments to the article.

CITATION LIST

Patent Literature

[PTL 1] Japanese Translation of PCT International Patent Application Publication No. 2012-529717

[PTL 2] Japanese Patent Application Laid-Open Publication No. 2009-098964

[PTL 3] Japanese Patent Application Laid-Open Publication No. 2014-049094

SUMMARY OF INVENTION

Technical Problem

However, in any of the above cited documents, a technology for efficiently collecting target information from an enormous amount of data in a variety of formats.

An example object of the present invention is to provide an information collection system, an information collection method, and a recording medium, which are capable of solving the above-mentioned problem and efficiently collecting target information from an enormous amount of data in a variety of formats.

Solution to Problem

An information collection system according to an exemplary aspect of the present invention includes: learning means for generating, by using learning data, a parser rule for extracting a target character string from data, the target character string being a character string including specific information; and extraction means for extracting the target character string from data by using the parser rule.

An information collection method according to an exemplary aspect of the present invention includes: generating, by using learning data, a parser rule for extracting a target character string from data, the target character string being a character string including specific information; and extracting the target character string from data by using the parser rule.

A computer readable recording medium according to an exemplary aspect of the present invention records thereon a program causing a computer to perform a method including: generating, by using learning data, a parser rule for extracting a target character string from data, the target character string being a character string including specific information; and extracting the target character string from data by using the parser rule.

Advantageous Effects of Invention

An advantageous effect of the present invention is to efficiently collect target information from an enormous amount of contents in a variety of formats.

BRIEF DESCRIPTION OF DRAWINGS

FIG. 4 is a flowchart illustrating learning processing in the first example embodiment.

FIG. 5 is a diagram illustrating a specific example of the learning processing in the first example embodiment.

FIG. 6 is a diagram illustrating examples of parser rules stored in a parser rule storage unit 120 in the first example embodiment.

FIG. 7 is a flowchart illustrating extraction processing in the first example embodiment.

FIG. 9 is a diagram illustrating examples of tables stored in a character string storage unit 140 in the first example embodiment.

FIG. 14 is a diagram illustrating an example of alarm mail in the first example embodiment.

FIG. 18 is a diagram illustrating an example of a table stored in a character string storage unit 140 in the second example embodiment.

FIG. 19 is a diagram illustrating a specific example of analysis and control processing in the second example embodiment.

EXAMPLE EMBODIMENT

Figure 1:
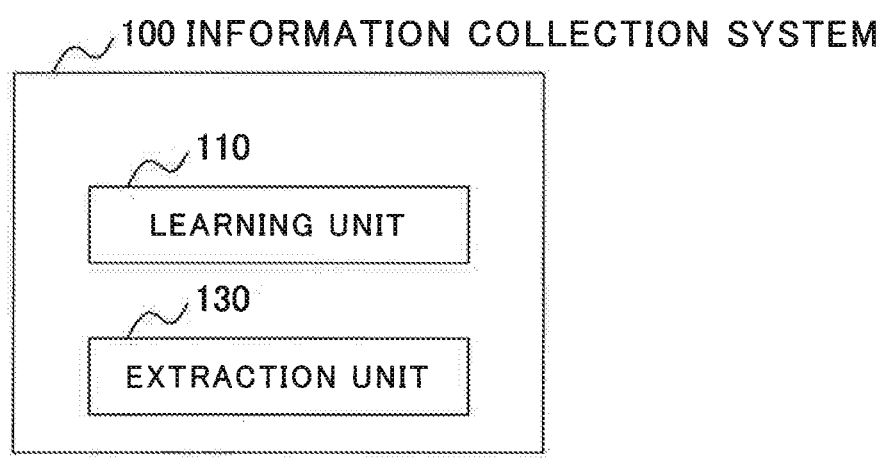
FIG. 1 is a block diagram illustrating a characteristic configuration according to a first example embodiment.

Example embodiments of the present invention will be described in detail with reference to the drawings. Note that, in the drawings and the example embodiments described in the description, the same reference signs are assigned to similar components, and a description thereof is omitted as appropriate.

First Example Embodiment

Figure 2:
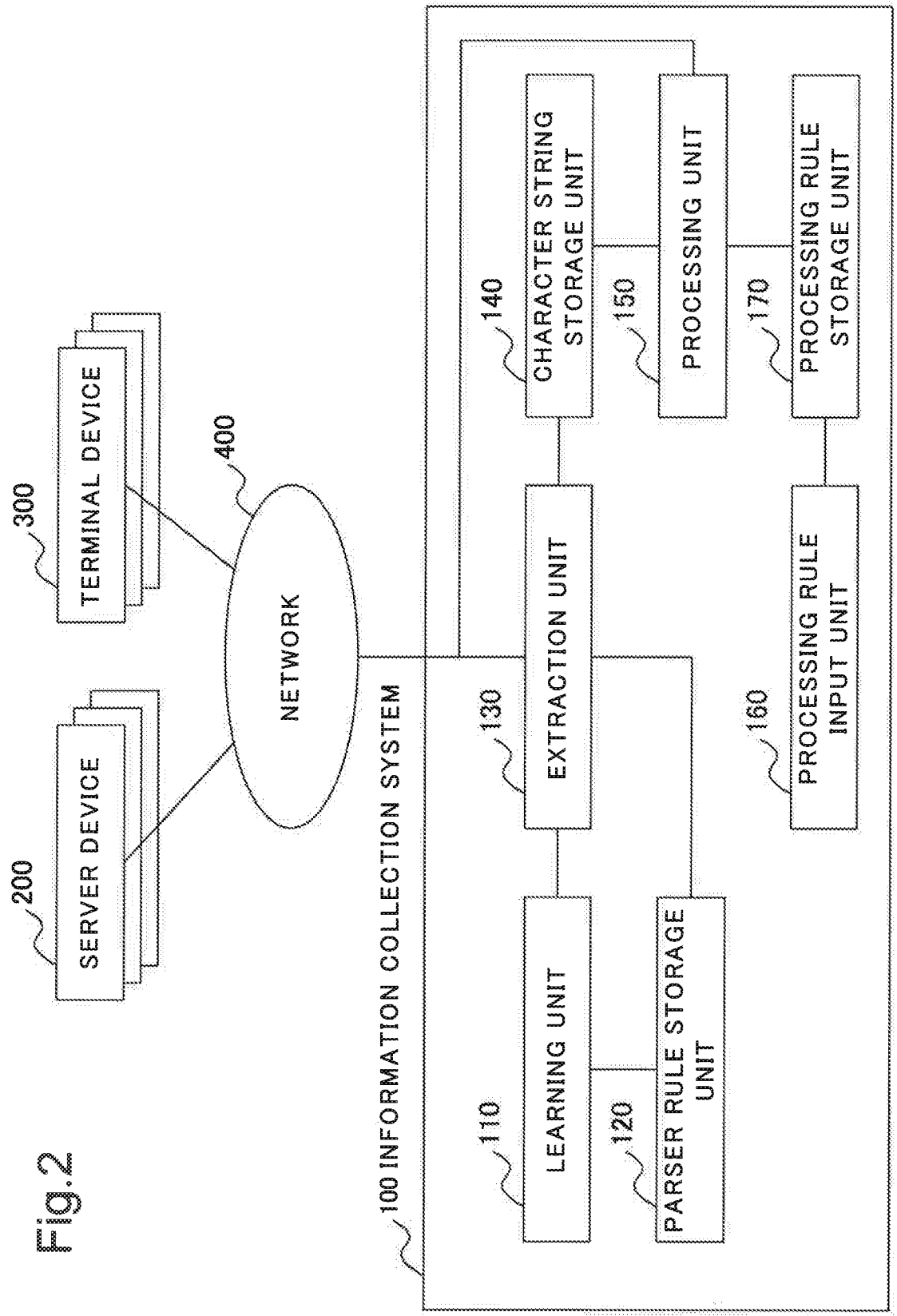
FIG. 2 is a block diagram illustrating a configuration according to the first example embodiment.

First, a configuration according to a first example embodiment will be described. FIG. 2 is a block diagram illustrating the configuration according to the first example embodiment. An information collection system 100 is connected to a server device 200 and a terminal device 300 through a network 400 such as an Internetwork. The server device 200 is a server that provides content data (hereinafter, also simply referred to as data) in a service such as SNS, for example. The data is described by using a predetermined data description language such as HTML, for example.

The information collection system 100 extracts "target character string", which is a character string to be subjected to various pieces of analysis and control processing, from the data acquired from the server device 200. For example, the target character string is a character string, which includes "specific information" such as a message issued by a user in SNS, a user name of the user, and a transmission date and time of the message. Herein, a data format that defines a storage method of the message, the user name, the transmission date and time, and the like in the data differs depending on the operator that provides services. The information collection system 100 extracts the target character string by using a parser rule corresponding to each of services. The information collection system 100 performs analysis and control processing on the basis of the extracted target character string.

Referring to FIG. 2, the information collection system 100 in the first example embodiment includes: a learning unit 110, a parser rule storage unit 120, an extraction unit 130, a character string storage unit 140, a processing unit 150; a processing rule input unit 160; and a processing rule storage unit 170.

The learning unit 110 acquires data to be learned (hereinafter, also be referred to as learning data) from the server device 200, and generates a parser rule by using the learning data. The parser rule is a rule for extracting the above-mentioned target character string from the data. The learning unit 110 generates the parser rule by using one or more pieces of learning data for each service, for example. The service is identified by a domain name included in a uniform resource locator (URL), for example.

The parser rule is designated by a description pattern of the data description language, for example. The learning unit 110 generates, as the parser rule, a description pattern of the data description language, the description pattern being a description pattern capable of specifying a character string including a keyword designated together with the learning data, in the learning data. For example, in a case where the data is described by HTML, the learning unit 110 generates, as the parser rule, a pattern of tags capable of specifying the target character string (surrounding the target character string).

The parser rule storage unit 120 stores the parser rule, which is generated by the learning unit 110, in association with the service.

The extraction unit 130 acquires, from the server device 200, data to be subjected to extraction of the target character string (hereinafter, also be referred to as processed data, or simply as data), and extracts the target character string from the data by using the parser rule associated with the service related to the data.

The character string storage unit 140 stores target character strings extracted by the extraction unit 130. The target character strings are stored in a table format such as Key-Value Store (KVS), for example.

The processing unit 150 performs the analysis and control processing on the basis of the extracted target character strings in accordance with a processing rule designated by an administrator or the like. The processing rule defines methods of analysis and control.

The processing rule input unit 160 receives an input of the processing rule from the administrator or the like.

The processing rule storage unit 170 stores one or more processing rules input from the administrator or the like.

The information collection system 100 may be a computer including a central processing unit (CPU) and a storage medium that stores a program, and operating by a control based on the program.

Figure 3:
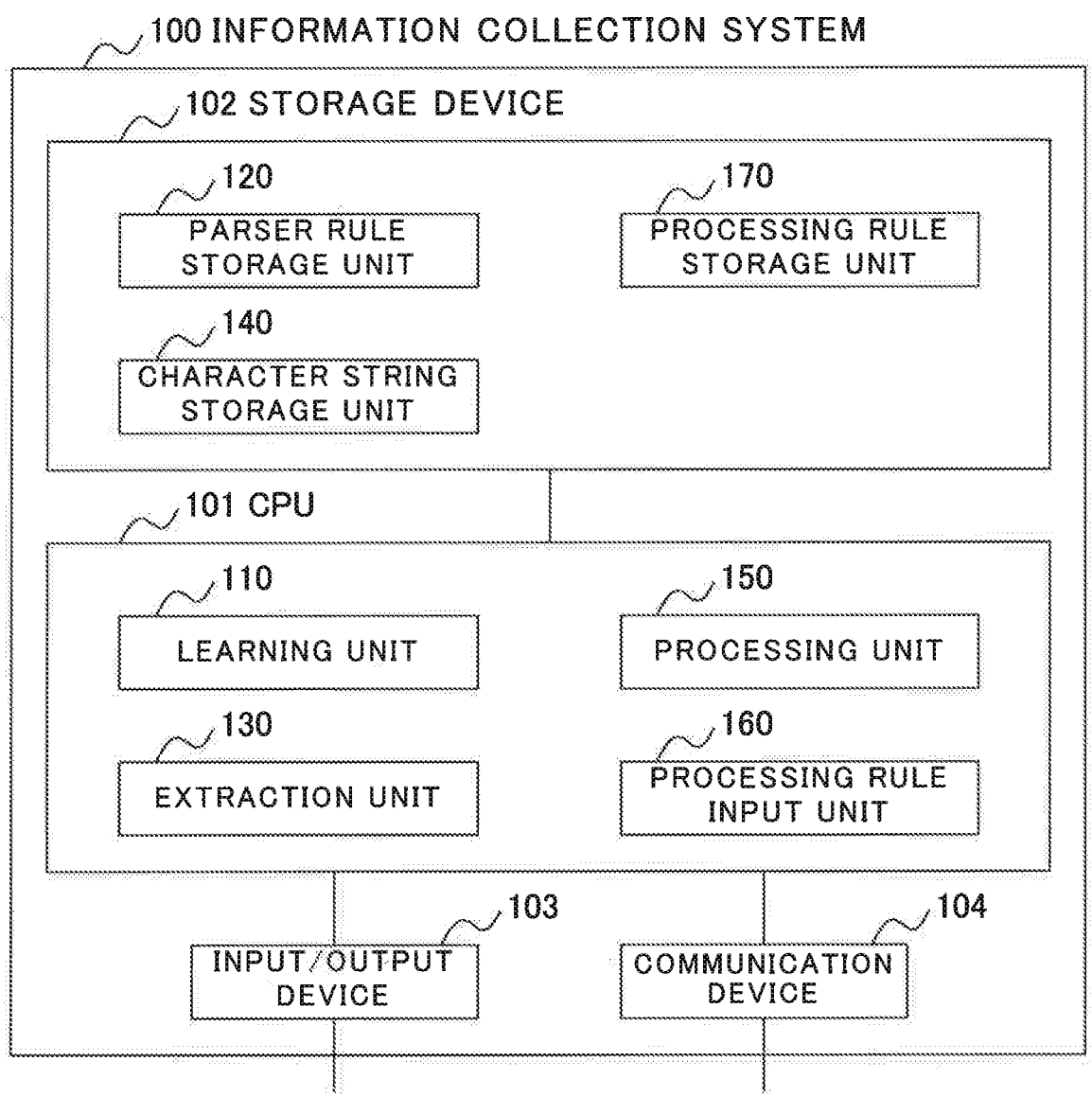
FIG. 3 is a block diagram illustrating a configuration of an information collection system 100 implemented by a computer in the first example embodiment.

FIG. 3 is a block diagram illustrating a configuration of the information collection system 100 implemented by the computer in the first example embodiment.

In this case, the information collection system 100 includes: a CPU 101; a storage device 102 (storage medium) such as a hard disk and a memory; an input/output device 103 including a keyboard, a display, and the like; and a communication device 104 that communicates with other devices and the like. The CPU 101 executes a program for implementing the learning unit 110, the extraction unit 130, the processing unit 150, and the processing rule input unit 160. The storage device 102 stores information in the parser rule storage unit 120, the character string storage unit 140, and the processing rule storage unit 170. The input/output device 103 receives designation of the learning data, the processed data, and the processing rule from the administrator or the like. Moreover, the communication device 104 may receive the designation of the learning data, the processed data, and the processing rule from the other devices.

Furthermore, a part of or all of the respective components of the information collection system 100 may be implemented by a general-purpose or dedicated circuitry, a processor, and a combination of these. These circuitry and processor may be composed of a single chip, or may be composed of a plurality of chips connected to one another via a bus. Moreover, a part of or all of the respective components of the information collection system 100 may be implemented by a combination of the above-mentioned circuitry and the like and a program.

In a case where a part of or all of the respective components of the information collection system 100 are implemented by pluralities of information processing apparatuses, circuitries, and the like, the pluralities of information processing apparatuses, circuitries, and the like may be arranged centrally, or may be distributed. For example, the information processing apparatuses, the circuitries, and the like may be implemented as a system in which the respective components are connected to one another via a communication network, such as a client and server system, a cloud computing system, and the like.

Next, the operation of the first example embodiment will be described.

Herein, as an example, a case of generating a parser rule for extracting a target character string from data of SNS, in learning processing, then analyzing a predetermined keyword included in target character strings and issuing a notice on a result of the analysis, in analysis and control processing, will be described.

<Learning Processing>

FIG. 4 is a flowchart illustrating the learning processing in the first example embodiment. FIG. 5 is a diagram illustrating a specific example of the learning processing in the first example embodiment.

First, the learning unit 110 receives designation of learning data from an administrator or the like (Step S101).

For example, the learning unit 110 receives designation of three pieces of learning data for a service "SNS 1", by URLs "URL 1", "URL 2", and "URL 3", as illustrated in FIG. 5. Moreover, together with the respective pieces of learning data, keywords "Keyword 1", "Keyword 2", and "Keyword 3" are designated. For each of the keywords, a character string of a message of a user (hereinafter, also referred to as a user message) in the corresponding piece of the learning data is designated. Further, together with these pieces of learning data, a table name "SNS 1" and a data label "Post", which are used in extraction processing to be described later, are designated. The table name is a name of a table for storing the target character strings extracted from the processed data. The data label is a name of a column for storing the user messages in the table.

The learning unit 110 acquires the designated learning data from the server device 200 (Step S102).

For example, the learning unit 110 acquires the pieces of learning data, which are designated by the URLs "URL 1", "URL 2", and "URL 3", from the server device 200, as illustrated in FIG. 5.

The learning unit 110 generates a parser rule by using the acquired learning data (Step S103).

For example, in the respective pieces of learning data, the learning unit 110 identifies tag patterns "<a><b Class="post" id=xx><c name="userx">Keywordx</c></b></a>" for extracting character strings including the designated keywords. Then, the learning unit 110 compares tags and attributes of the tags among the tag patterns identified for the respective pieces of learning data, and extracts an attribute having a common tag and a common value in the common tag, thereby generating a parser rule "<a><b Class="post"><c>Value</c></b></a>", as illustrated in FIG. 5. Here, Value indicates a target character string to be extracted.

Further, the learning unit 110 associates the table name "SNS 1", the data label "Post", a URL "http://hoge.com", and the generated parser rule "<a><b Class="post"><c>Value</c></b></a>" with one another, as illustrated in FIG. 5. Here, the URL "http://hoge.com" is a URL corresponding to the service "SNS 1", and is a domain name included commonly in the above-mentioned URLs "URL 1", "URL 2", and "URL 3", for example.

Moreover, the learning unit 110 performs the learning processing in the same manner also for user names (data label "User") and transmission dates and times of the messages (data label "Date"), besides the user messages. Note that, in the learning data in FIG. 5, the user names are designated by an attribute "name" of a tag "c". In the learning data in FIG. 5, the transmission dates and times are omitted.

The learning unit 110 saves the generated parser rule in the parser rule storage unit 120 (Step S104).

FIG. 6 is a diagram illustrating examples of the parser rules stored in the parser rule storage unit 120 in the first example embodiment.

For example, the learning unit 110 saves, in the parser rule storage unit 120, the generated parser rules for the user message (data label "Post"), the user name (data label "User"), and the transmission date and time (data label "Date") of the service "SNS 1", as illustrated in FIG. 6.

Furthermore, the learning unit 110 performs the learning processing in the same manner also for other services "SNS 2" and "SNS 3". As a result, the parser rules are stored in the parser rule storage unit 120 for the user messages, user names, and transmission dates and times of the respective services, as in FIG. 6.

Note that the learning unit 110 may further generate a script, a program module, or a source code thereof for extracting the target character strings from the data in accordance with the parser rule, and may save the generated script, program module, or source code in the parser rule storage unit 120.

<Extraction Processing>

Figure 8:
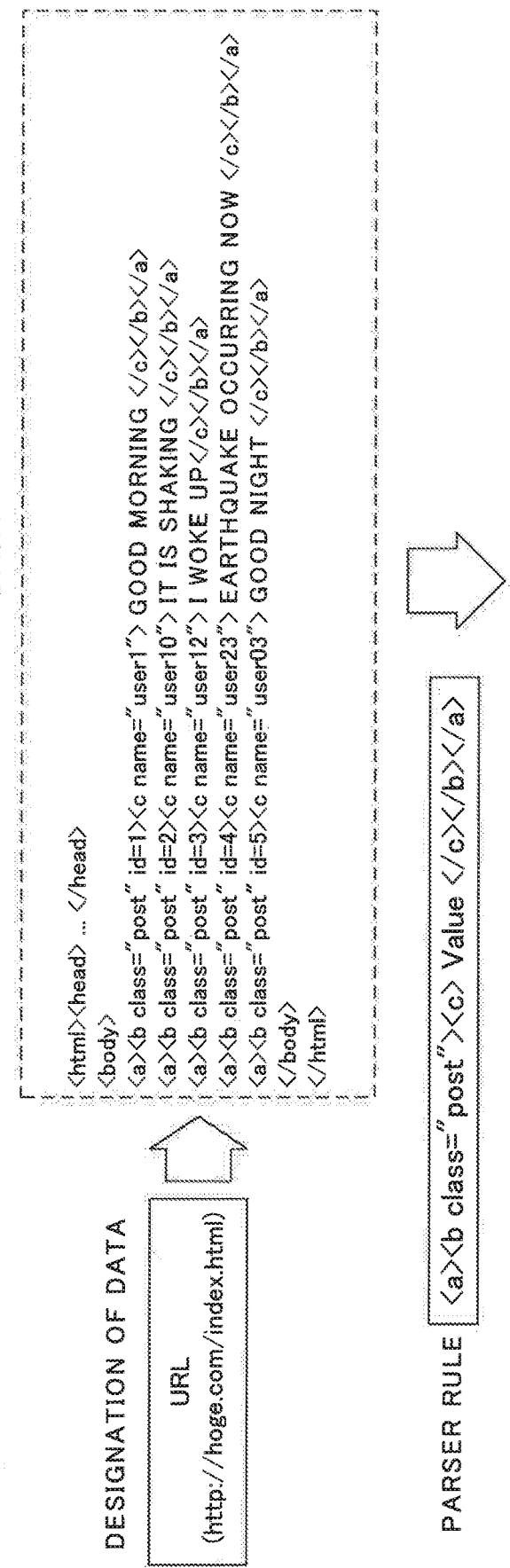
FIG. 8 is a diagram illustrating a specific example of the extraction processing in the first example embodiment.

FIG. 7 is a flowchart illustrating extraction processing in the first example embodiment. FIG. 8 is a diagram illustrating a specific example of the extraction processing in the first example embodiment. The extraction processing is executed after the parser rule is generated by the learning processing.

First, the extraction unit 130 receives designation of data from the administrator or the like (Step S201).

For example, the extraction unit 130 receives designation of data for the service "SNS 1" by a URL "http://hoge.com/index.html", as illustrated in FIG. 8.

The extraction unit 130 acquires the designated data from the server device 200 (Step S202).

For example, the extraction unit 130 acquires data designated by the URL "http://hoge.com/index.html" from the server device 200, as illustrated in FIG. 8.

The extraction unit 130 acquires a parser rule associated with the service of the data from the parser rule storage unit 120 (Step S203).

For example, from among the parser rules in FIG. 6, the extraction unit 130 acquires the parser rule "<a><b Class="post"><c>Value</c></b></a>" associated with the URL "http://hoge.com", which is acquired from the domain name of the URL designating the data, and the data label "Post", as illustrated in FIG. 8.

The extraction unit 130 extracts target character strings from the data by using the acquired parser rule (Step S204).

For example, the extraction unit 130 extracts, as target character strings, character strings corresponding to the user messages, which are specified by the tag pattern "<a><b Class="post"><c>Value</c></b></a>" of the parser rule, from the data, as illustrated in FIG. 8. Note that the extraction unit 130 may also extract a value of an attribute of a predetermined tag for identifying a set of related target character strings with each of the target character strings, as an Object ID. In an example in FIG. 8, it is assumed that a set of the user message, the user name, and the transmission date and time are identifiable by the attribute "id" of the tag "b". In this case, the extraction unit 130 extracts values of the attribute "id" of the tag "b" as Object IDs with the user messages, as illustrated in FIG. 8.

Moreover, the extraction unit 130 extracts target character strings in the same manner also for the user names (data label "User") and the transmission dates and times of the messages (data label "Date"), besides the user messages.

The extraction unit 130 saves the extracted target character strings in the character string storage unit 140 (Step S205).

FIG. 9 is a diagram illustrating an example of tables stored in the character string storage unit 140 in the first example embodiment.

For example, the extraction unit 130 sets the user messages (data label "Post"), the user names (data label "User"), and the transmission dates and times (data label "Date") extracted as the target character strings, in the table "SNS 1", and saves the table in the character string storage unit 140, as illustrated in FIG. 9. Herein, in each column in the table, the extraction unit 130 sets the user message, the user name, and the transmission date and time, which have the same Object ID.

Furthermore, the extraction unit 130 performs the extraction processing in the same manner also for the other services "SNS 2" and "SNS 3". As a result, the tables "SNS 1", "SNS 2", and "SNS 3" are stored in the character string storage unit 140, as in FIG. 9.

<Analysis and Control Processing>

Figure 10:
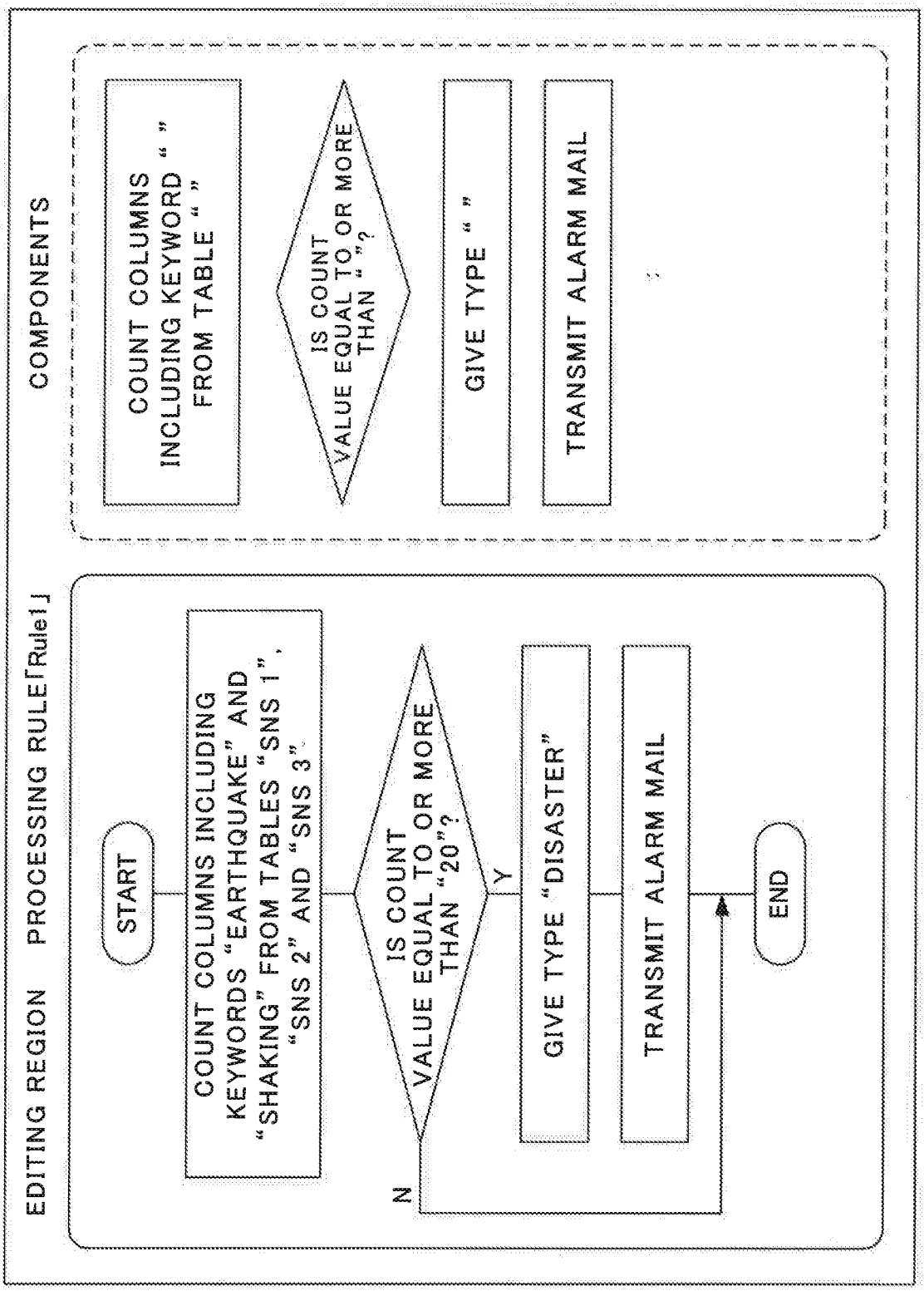
FIG. 10 is a diagram illustrating an example of a processing rule input screen in the first example embodiment.

FIG. 10 is a diagram illustrating an example of a processing rule input screen in the first example embodiment. On the input screen in FIG. 10, components for configuring the processing rule and an editing region of the processing rule are displayed. For example, the administrator or the like selects a component from among the displayed components and disposes the selected component in the editing region, and set a parameter, thereby editing the processing rule. In the example in FIG. 10, a processing rule "Rule 1" is input. As the processing rule "Rule 1", processing for, in a case where the number of target character strings including a keyword "earthquake" or "shake" is equal to or more than a threshold value "20" in the tables "SNS 1", "SNS 2", and "SNS 3", giving a type "disaster" to the target character strings and transmitting alarm mail, is described.

Herein, it is assumed that the processing rule input unit 160 receives in advance an input of the processing rule "Rule 1" as in FIG. 10 from the administrator or the like through the input/output device 103, and saves the received processing rule "Rule 1" in the processing rule storage unit 170.

Note that the processing rule input unit 160 may further generate a script, a program module, or source code thereof for performing analysis and control processing in accordance with the processing rule, and may save the generated script, program module, or source code in the processing rule storage unit 170.

Figure 11:
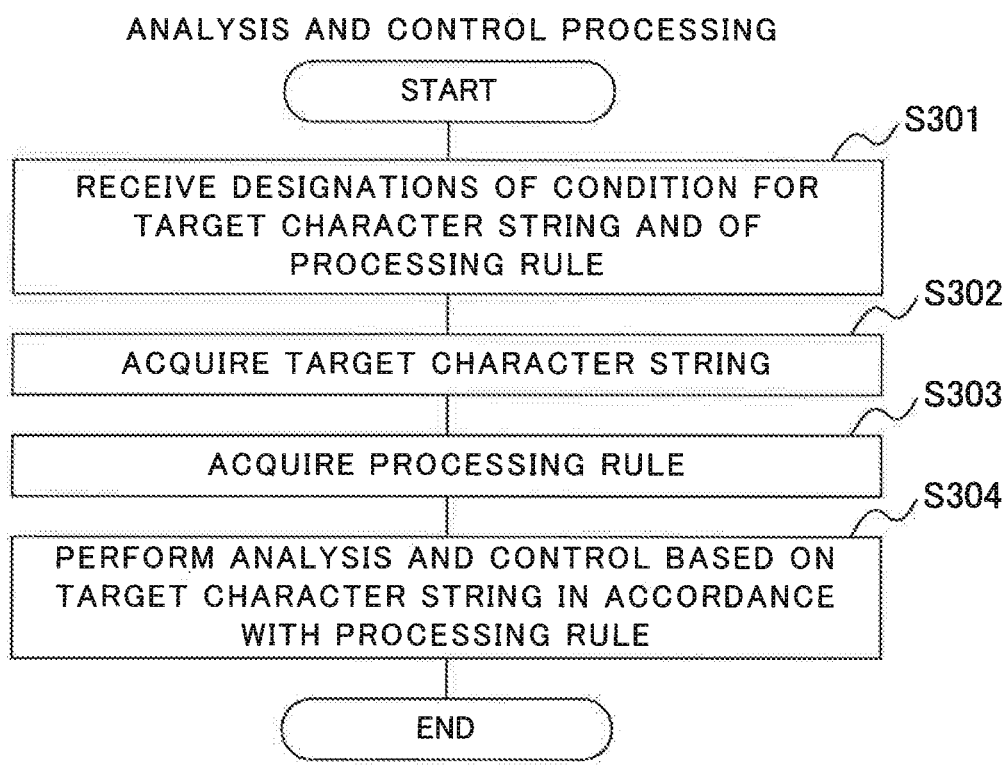
FIG. 11 is a flowchart illustrating analysis and control processing in the first example embodiment.
Figure 12:
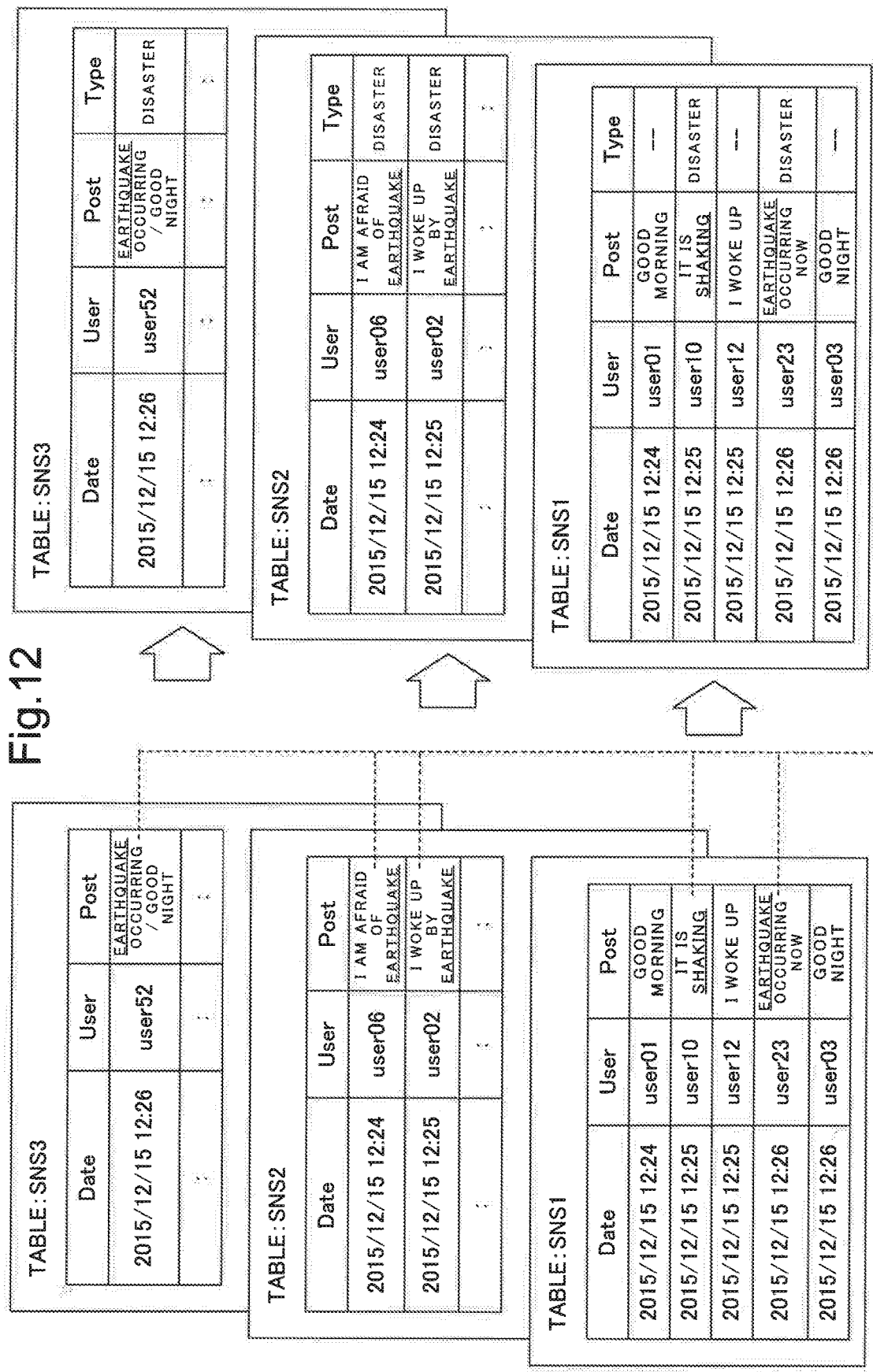
FIG. 12 is a diagram illustrating a specific example of the analysis and control processing in the first example embodiment.

FIG. 11 is a flowchart illustrating the analysis and control processing in the first example embodiment. FIG. 12 is a diagram illustrating a specific example of the analysis and control processing in the first example embodiment. The analysis and control processing is executed after the target character strings are extracted by the extraction processing.

First, the processing unit 150 receives designations of a condition for the target character strings to be subjected to the analysis and control processing, and of the processing rule to be used, from the administrator or the like (Step S301).

Figure 13:
FIG. 13 is a diagram illustrating an example of an analysis result screen in the first example embodiment.

FIG. 13 is a diagram illustrating an example of an analysis result screen in the first example embodiment.

For example, the processing unit 150 outputs such an analysis result screen as in FIG. 13 to the administrator or the like through the input/output device 103, and receives designations of a condition for the target character strings (transmission date and time "date>=2015/12/15"), and of the processing rule "Rule 1".

The processing unit 150 acquires target character strings which meet the designated condition, from the character string storage unit 140 (Step S302).

For example, the processing unit 150 acquires target character strings which meet the condition of the acquired date and time "date>=2015/12/15", from the tables "SNS 1", "SNS 2", and "SNS 3" in FIG. 9.

The processing unit 150 acquires the designated processing rule, from the processing rule storage unit 170 (Step S303).

For example, the processing unit 150 acquires the processing rule "Rule 1" as in FIG. 10.

The processing unit 150 performs the analysis and control processing on the basis of the acquired target character strings in accordance with the acquired processing rule (Step S304).

For example, the processing unit 150 counts the number of target character strings including the keyword "earthquake" or "shake" among the target character strings in the respective tables, in accordance with the processing rule "Rule 1" in FIG. 10, as in FIG. 12. In a case where, as a result of counting, the number is equal to or more than "20", the processing unit 150 gives "disaster" as a type (data label "Type") to the target character strings including the keyword "earthquake" or "shake", as in FIG. 12.

The processing unit 150 sets the target character strings, which are given the type "disaster", to an analysis result of the analysis result screen, and outputs the analysis result screen to the administrator or the like, as in FIG. 13. Further, the processing unit 150 may update the tables, which are stored in the character string storage unit 140, for the target character strings to which the type "disaster" is given.

FIG. 14 is a diagram illustrating an example of alarm mail in the first example embodiment.

Further, the processing unit 150 transmits alarm mail indicating that a disaster (earthquake) has occurred as in FIG. 14, through the network 400 to the terminal device 300 registered as a notification recipient in advance. Herein, the processing unit 150 sets a content of the mail in accordance with the processing rule, for example. In this case, the processing unit 150 may acquire and set the content of the mail from other devices designated by the processing rule.

As described above, even in a case where the user messages and the like in the data of the SNSs are provided by the data in a variety of formats for each of the services, the messages can be efficiently collected and analyzed.

Thus, the operations of the first example embodiment are completed.

Note that, although the above-mentioned example embodiment has been described by taking a case where the data are described by HTML as an example, the data may be described by other data description languages as long as specific information can be extracted as target character strings by analyzing the description by the data description language. For example, the data may be described by other markup languages such as Extensible Markup Language (XML), or may be described by the languages other than the markup languages including JAVA (registered trademark) Script Object Notation (JSON) and the like.

Moreover, in the above-mentioned example embodiment, the extraction unit 130 acquires, as the processed data, the data indicated by the URLs designated from the administrator or the like. However, without being limited to this, the extraction unit 130 may acquire the data by crawling through the network 400. In this case, the extraction unit 130 may acquire the data by passing through a predetermined number of links from data indicated by a URL as a certain starting point, and may use the acquired data. Moreover, the extraction unit 130 may acquire data provided by a predetermined number of URLs acquired by a search result of a search engine, and may use the acquired data.

Moreover, the extraction unit 130 may acquire, as the processed data, data transmitted and received through the network 400 by using a network device such as a proxy server.

Moreover, in the above-mentioned example embodiment, the analysis and control processing is executed by the processing unit 150 on the basis of the plurality of target character strings extracted by the extraction unit 130. However, without being limited to this, every time when the extraction unit 130 acquires the processed data and extracts the target character string, the processing unit 150 may execute the analysis and control processing on the basis of the extracted target character string.

Moreover, in the above-mentioned example embodiment, in the learning processing, the parser rules for extracting the user messages, the user names, the transmission dates and times, and the like as the target character strings from the data of the SNSs are generated. Moreover, in the analysis and control processing, the number of predetermined keywords included in the target character strings is calculated, and a notice on the result of the calculation is issued.

However, without being limited to this, the information extracted as the target character string by the parser rule may be any information as long as the information is acquired by analyzing the description made by the data description language. Moreover, the analysis and control processing may be any processing as long as the analysis and control processing is processing performed on the basis of the extracted target character string.

For example, from data for providing a list of internet protocol (IP) addresses or domain names which have high falsification possibility and vulnerability (that is, a blacklist), the blacklist may be extracted as the target character string. Moreover, from data for providing file names and URLs of malware (that is, a malware list), the malware list may be extracted as the target character string. In this case, in the analysis and control processing, a policy for shutting off communication related to the blacklist or the malware list may be set.

Figure 15:
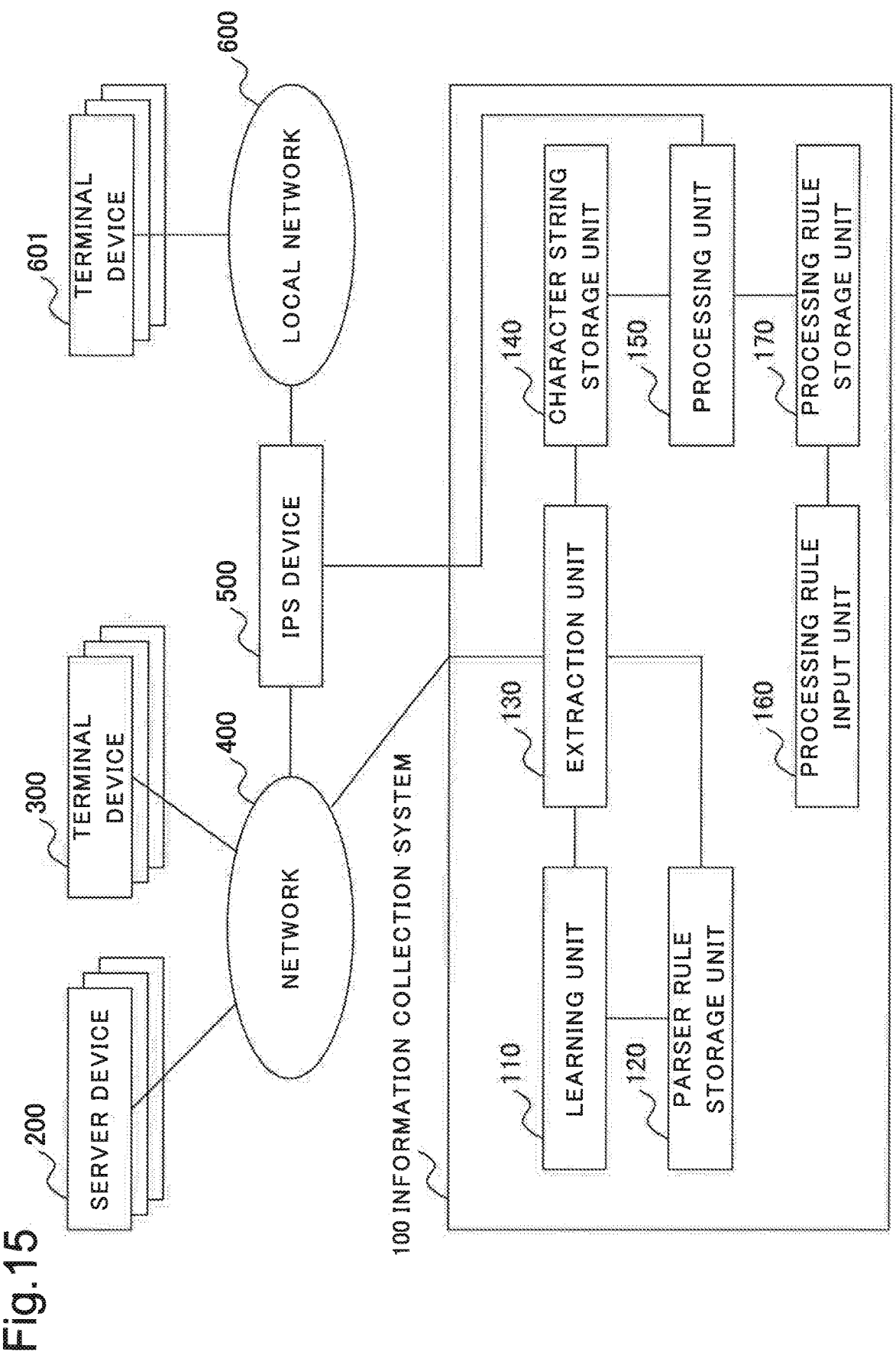
FIG. 15 is a block diagram illustrating another configuration according to the first example embodiment.

FIG. 15 is a block diagram illustrating another configuration according to the first example embodiment. An information collection system 100 in FIG. 15 includes the same components as those of the information collection system 100 in FIG. 2.

In FIG. 15, the server device 200 is a server providing the above-mentioned blacklist or malware list. The information collection system 100 is connected to an intrusion prevention system (IPS) device 500. The IPS device 500 controls communication between the network 400 and a terminal device 601 connected to a local network 600, in accordance with the policy.

For example, the learning unit 110 in FIG. 15 generates a parser rule, by using learning data acquired from the server device 200 and a blacklist or malware list included in the learning data and designated as a keyword.

The extraction unit 130 extracts the target character string (blacklist or malware list) from the data acquired from the server device 200 by using the parser rule.

The processing unit 150 extracts IP addresses or domain names included in the blacklist, or file names or URLs included in the malware list, from the target character string, in accordance with the processing rule. Then, the processing unit 150 sets, to the IPS device 500, a policy for shutting off communication with the extracted IP addresses or domain names, or communication of messages including the extracted file names or URLs.

In this way, even in a case where a blacklist or malware list is provided by data in a variety of formats for each of the services, the blacklist or the malware list can be efficiently collected according to the services, and the collected blacklist or malware list can be reflected on the communication policy.

Moreover, for example, a user comment to a blog page may be extracted as the target character string. In this case, in the analysis and control processing, an inappropriate expression included in the user comment may be detected, and writing of the user comment may be blocked, or a log of the user comment may be acquired.

Figure 16:
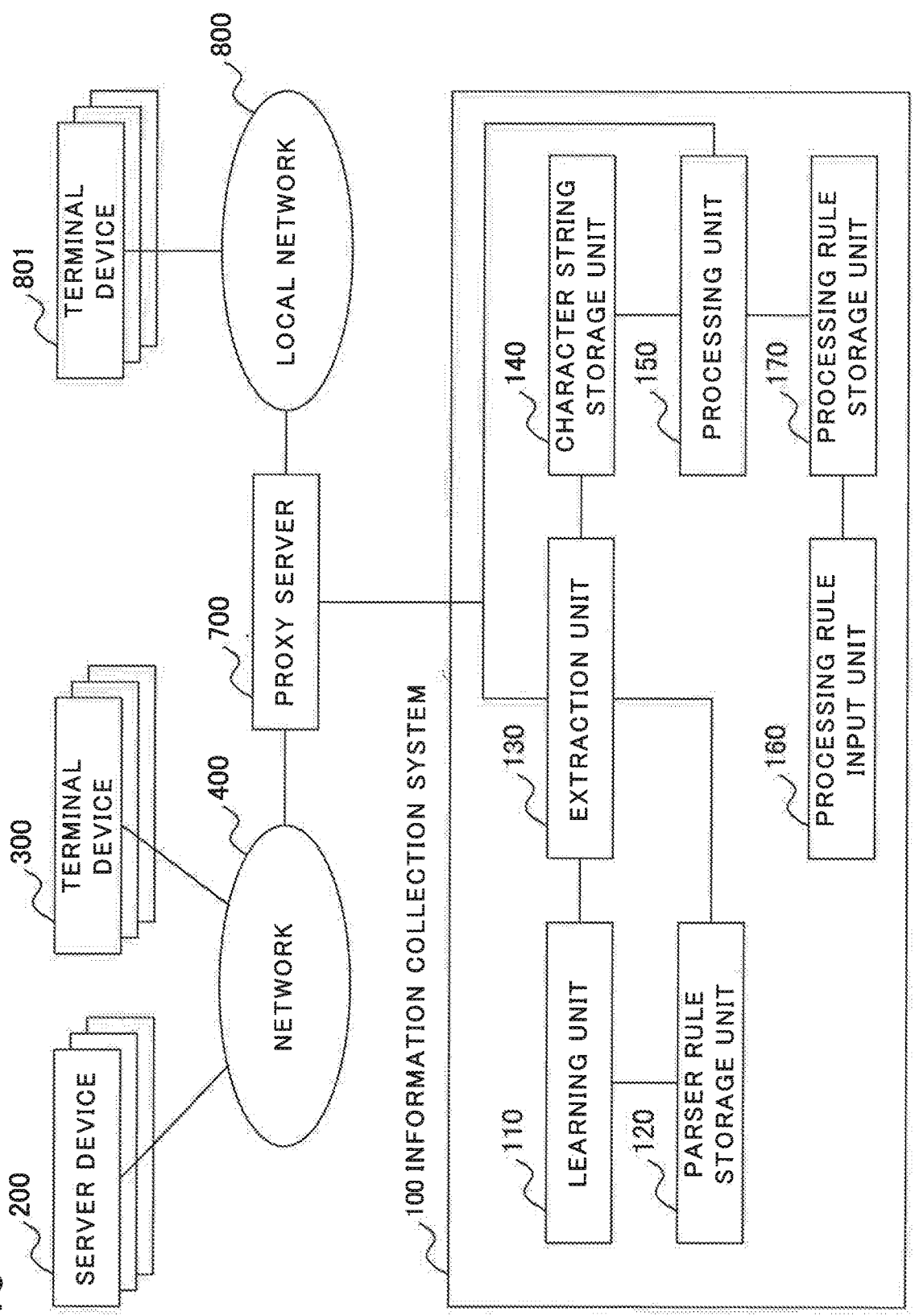
FIG. 16 is a block diagram illustrating still another configuration according to the first example embodiment.

FIG. 16 is a block diagram illustrating still another configuration according to the first example embodiment. An information collection system 100 in FIG. 16 also includes the same components as those of the information collection system 100 in FIG. 2.

In FIG. 16, the server device 200 is a server for providing blogs. The information collection system 100 is connected to a proxy server 700. The proxy server 700 controls communication between the network 400 and a terminal device 801 connected to a local network 800.

For example, the learning unit 110 in FIG. 16 generates a parser rule, by using learning data including user comments to blogs and being transmitted from the terminal device 801 to the server device 200, and the user comments included in the data and designated as keywords.

The extraction unit 130 acquires the data transmitted from the terminal device 801 to the server device 200, through the proxy server 700. The extraction unit 130 extracts the target character strings (user comments) from the acquired data by using the parser rule.

The processing unit 150 extracts an inappropriate expression such as an expression corresponding to a malicious slander from the target character strings, in accordance with a processing rule. Then, the processing unit 150 controls the proxy server 700 to block transmission of the data, from which the inappropriate expression is extracted, to the server device 200. Moreover, the processing unit 150 may further save a log indicating an IP address and the like of a terminal device 801 which is a transmission source of the data, from which the inappropriate expression is detected, in a log storage unit (not illustrated).

In this way, even in a case where writing to SNSs and blogs is performed by contents in a variety of formats for each of the services, written entries can be efficiently collected according to the services, and inappropriate written entries can be detected.

Moreover, news articles, weather reports, program information, and the like may be extracted as the target character strings from content data of news sites, for example. Moreover, analysis results and the like may be extracted from content data of sites which analyze and provide information including people's networks, people's interests, and the like on the Internet, as the target character strings.

Moreover, in the analysis and control processing, a file name of malware may be detected from SNS messages acquired as target character strings, and the other analyzer or the like may be caused to analyze the malware, for example. Moreover, in the analysis and control processing, from the analysis results of the people's networks and the people's interests, which are acquired as target character strings, specific people's networks and interests may be extracted, or a person having a specific interest may be extracted.

Next, a characteristic configuration of the first example embodiment will be described. FIG. 1 is a block diagram illustrating the characteristic configuration according to the first example embodiment.

Referring to FIG. 1, an information collection system 100 includes a learning unit 110 and an extraction unit 130. The learning unit 110 generates, by using learning data, a parser rule for extracting a target character string from data, the target character string being a character string including specific information. The extraction unit 130 extracts the target character string from data by using the parser rule.

Next, an advantageous effect of the first example embodiment will be described.

In accordance with the first example embodiment, the target information can be efficiently collected from an enormous amount of contents in a variety of formats. A reason for the above is that the learning unit 110 generates a parser rule for extracting a target character string, which is a character string including specific information, by using learning data, and the extraction unit 130 extracts the target character string from data by using the generated parser rule.

In this way, a parser program for extracting necessary information from the contents in a variety of formats can be generated in a short time without analysis of the contents by a developer. Moreover, even when specifications of the contents are changed, reprogramming of the parser program can be executed at low cost. Further, a notation of the parser program is integrated for the contents in a variety of formats, and accordingly, readability and reusability thereof are improved.

Moreover, in accordance with the first example embodiment, varieties of analyses and controls can be efficiently executed on the basis of information extracted from an enormous amount of the contents in a variety of formats. A reason for the above is that the processing unit 150 performs the analysis and control processing in accordance with a processing rule on the basis of target character strings extracted by the extraction unit 130.

Moreover, in accordance with the first example embodiment, analyses and controls of various methods can be executed efficiently. A reason for the above is that the processing rule storage unit 170 stores one or more processing rules, and that the processing unit 150 performs the analysis and control processing in accordance with the processing rule designated by the administrator or the like.

Second Example Embodiment

Next, a second example embodiment will be described.

The second example embodiment is different from the first example embodiment in that the processing unit 150 determines new learning data on the basis of extracted target character strings.

The processing unit 150 determines the new learning data on the basis of the extracted target character strings in accordance with a processing rule. Herein, in a case where a specific keyword and URL are included in the target character strings, the processing unit 150 determines data indicated by the URL as the new learning data.

The learning unit 110 generates a parser rule by using the new learning data.

Figure 17:
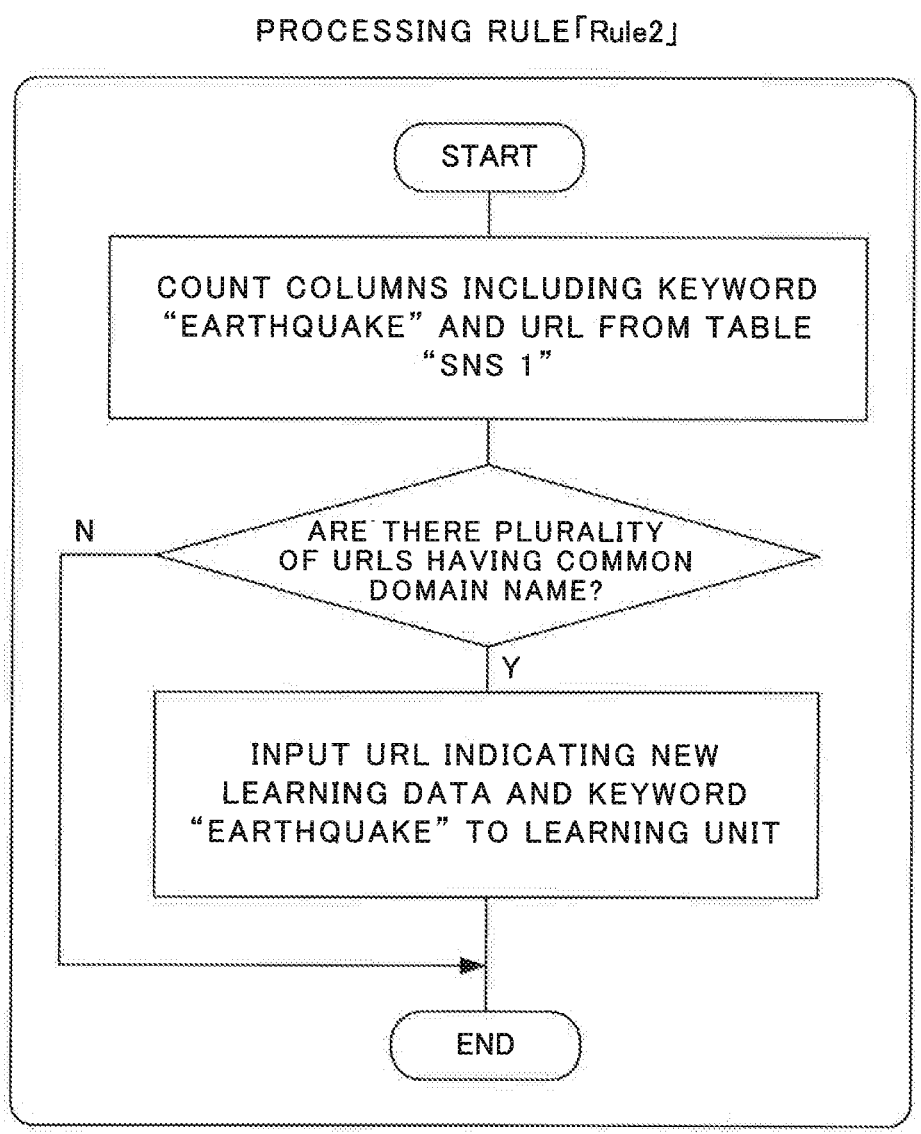
FIG. 17 is a diagram illustrating an example of a processing rule in a second example embodiment.

FIG. 17 is a diagram illustrating an example of a processing rule in the second example embodiment. In the example in FIG. 17, a processing rule "Rule 2" is defined. In the processing rule "Rule 2", processing for, in a case where a plurality of the target character strings including a specific keyword "earthquake" and a URL of a common domain name are detected in the table "SNS 1", designating new learning data for the learning unit 110, is described. The new learning data are designated by the detected URL. Moreover, the keyword "earthquake" is designated as a character string to be extracted.

Herein, it is assumed that the processing rule input unit 160 receives in advance an input of the processing rule "Rule 2" as in FIG. 17 from the administrator or the like, and saves the received processing rule "Rule 2" in the processing rule storage unit 170.

FIG. 18 is a diagram illustrating an example of a table stored in the character string storage unit 140 in the second example embodiment.

Moreover, it is assumed that the parser rules as in FIG. 6 are stored in the parser rule storage unit 120 in the same manner as in the first example embodiment, and that a table "SNS 1" as in FIG. 18 is stored by the extraction processing in the character string storage unit 140.

FIG. 19 is a diagram illustrating a specific example of the analysis and control processing in the second example embodiment.

The processing unit 150 detects the target character strings including the keyword "earthquake" and the URL of the common domain name "news.com" from target character strings in the table of FIG. 18, in accordance with the processing rule "Rule 2" in FIG. 17, as in FIG. 19. The processing unit 150 inputs, to the learning unit 110, URLs "http://news.com/news1.html" and "http://news.com/news2.html" of the detected target character strings as the URLs indicating the new learning data, together with the keyword "earthquake".

Figure 20:
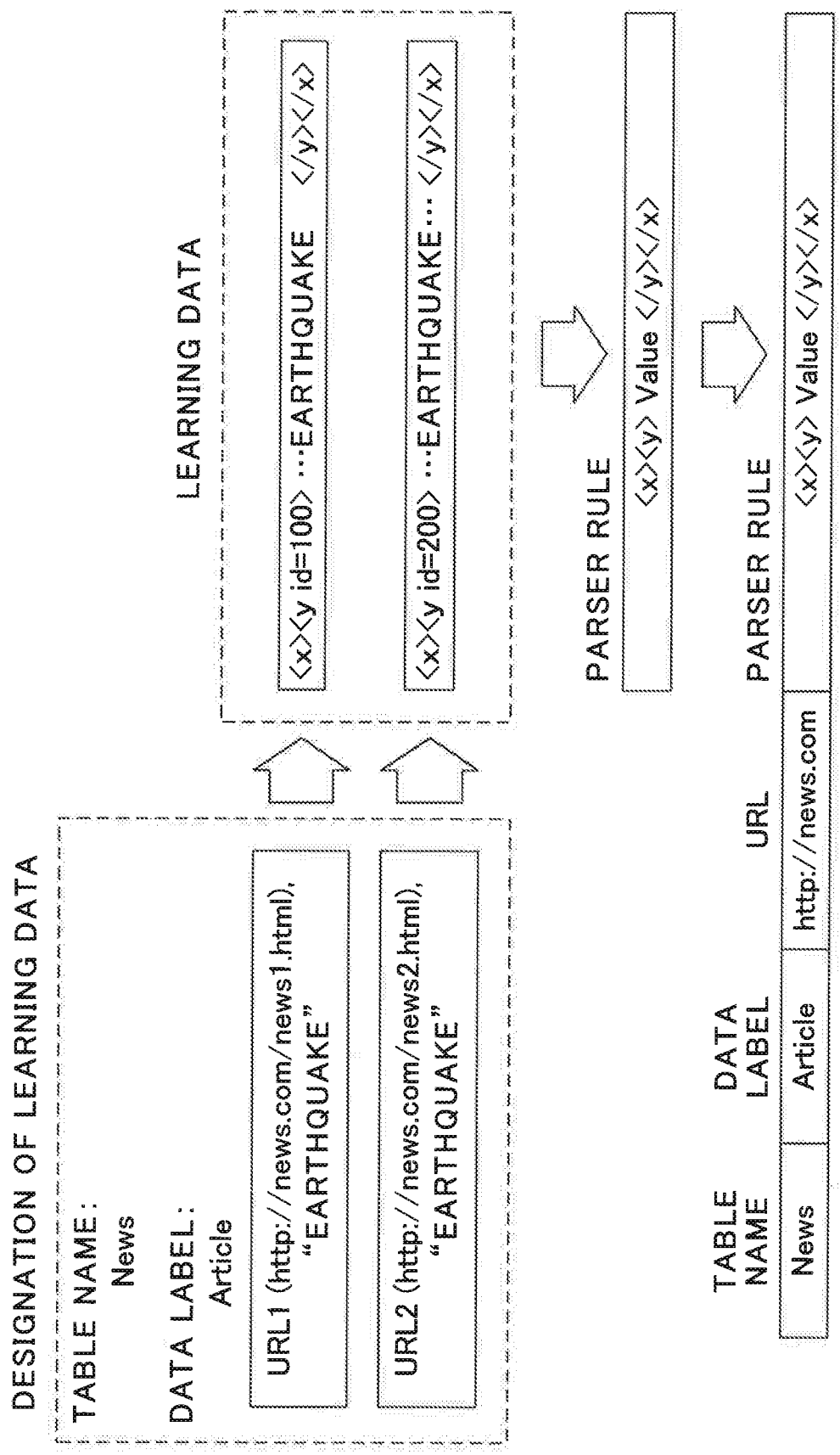
FIG. 20 is a diagram illustrating a specific example of learning processing in the second example embodiment.

FIG. 20 is a diagram illustrating a specific example of the learning processing in the second example embodiment.

The learning unit 110 acquires learning data designated by the respective URLs, and generates a parser rule. Herein, when the learning data include the keyword "earthquake" designated by the learning data, then the learning unit 110 specifies a tag pattern for extracting a character string including the keyword, and generates a new parser rule "<x><y>Value</y></x>" as in FIG. 20. The learning unit 110 associates the URL "http://news.com" and the new parser rule "<x><y>Value</y></x>" with each other, as in FIG. 20, and saves those in the parser rule storage unit 120.

Thereafter, extraction of the target character strings by using the new parser rule by the extraction unit 130, determination of the new learning data by the processing unit 150, and generation of the new parser rule by the learning unit 110 are repeated.

In this way, for information related to a specific keyword, parser rules for extracting target character strings from a variety of services, in addition to a service designated first as learning data, are efficiently generated without designation of learning data by the administrator.

Next, an advantageous effect of the second example embodiment of the present invention will be described.

In accordance with the second example embodiment of the present invention, the parser rule for extracting the target character strings from a variety of services can be generated more efficiently, in addition to the advantageous effects of the first example embodiment. A reason for the above is that the processing unit 150 determines the new learning data on the basis of the extracted target character strings in accordance with the processing rule, and that the learning unit 110 generates the parser rule by using the determined new learning data.

While the present invention has been particularly shown and described with reference to the example embodiments thereof, the present invention is not limited to the embodiments. It will be understood by those of ordinary skill in the art that various changes in form and details may be made therein without departing from the spirit and scope of the present invention as defined by the claims.

REFERENCE SIGNS LIST

100 Information collection system
101 CPU
102 Storage device
103 Input/output device
104 Communication device
110 Learning unit
120 Parser rule storage unit
130 Extraction unit
140 Character string storage unit
150 Processing unit
160 Processing rule input unit
170 Processing rule storage unit
200 Server device
300 Terminal device
400 Network
500 IPS device
600 Local network
601 Terminal device
700 Proxy server
800 Local network
801 Terminal device

The invention claimed is:

1. An information collection system comprising:
a memory storing instructions; and
one or more processors configured to execute the instructions to:
generate, by using learning data, a parser rule for extracting a target character string from data, the target character string being a character string including specific information,
extract the target character string from data by using the parser rule;
determine new learning data, by performing, in accordance with a processing rule, at least one of predetermined analysis and control, based on the extracted target character string; and
generate another of the parser rule by using the determined new learning data,
wherein, as the new learning data, other data that is designated in the extracted target character string is determined, and
wherein the other data includes a data which can identify a service, and the other data shows an address of the service.

2. The information collection system according to claim 1, wherein the one or more processors are further configured to execute the instructions to:
save the generated parser rule in association with a service related to the learning data, and
wherein the target character string is extracted from the data by using the parser rule associated with a service related to the data.

3. The information collection system according to claim 1, wherein the data are described by a predetermined data description language, and
wherein a description pattern by the predetermined data description language, being capable of specifying a character string including a designated keyword in the learning data, is generated as the parser rule.

4. The information collection system according to claim 1 wherein the one or more processors are further configured to execute the instructions to:
store one or more processing rules, and
wherein processing for at least one of the predetermined analysis and control is performed in accordance with a designated processing rule among the one or more processing rules.

5. An information collection method comprising:
generating, by using learning data, a parser rule for extracting a target character string from data, the target character string being a character string including specific information;
extracting the target character string from data by using the parser rule;
determining new learning data, by performing, in accordance with a processing rule, at least one of predetermined analysis and control, based on the extracted target character string; and
generating another of the parser rule by using the determined new learning data,
wherein, as the new learning data, other data that is designated in the extracted target character string is determined, and
wherein the other data includes a data which can identify a service, and the other data shows an address of the service.

6. A non-transitory computer readable recording medium recording thereon a program that, if executed, causes a computer to perform a method comprising:
generating, by using learning data, a parser rule for extracting a target character string from data, the target character string being a character string including specific information;
extracting the target character string from data by using the parser rule;

determining new learning data, by performing, in accordance with a processing rule, at least one of predetermined analysis and control, based on the extracted target character string; and generating another of the parser rule by using the determined new learning data, wherein, as the new learning data, other data that is designated in the extracted target character string is determined, and wherein the other data includes a data which can identify a service, and the other data shows an address of the service.

* * * * *